(12) United States Patent
Chen

(10) Patent No.: US 7,227,340 B2
(45) Date of Patent: Jun. 5, 2007

(54) ALTERNATOR RECTIFIER WITH COIL-SENSOR CONTROLLED MOSFETS

(75) Inventor: Hanyang B. Chen, Ypsilanti, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 11/509,237

(22) Filed: Aug. 24, 2006

(65) Prior Publication Data

US 2006/0284605 A1    Dec. 21, 2006

Related U.S. Application Data

(62) Division of application No. 10/885,978, filed on Jul. 7, 2004, now Pat. No. 7,116,080.

(51) Int. Cl.
*H02P 9/00* (2006.01)

(52) U.S. Cl. .......................................... 322/24; 322/37

(58) Field of Classification Search ................. 322/22, 322/23, 24, 25, 27, 28, 37, 46, 59, 89, 99; 363/67; 307/10.1
See application file for complete search history.

(56) References Cited

U.S. PATENT DOCUMENTS

| | | | | | |
|---|---|---|---|---|---|
| 3,675,117 | A | * | 7/1972 | Reimers | 322/31 |
| 3,984,750 | A | * | 10/1976 | Pfeffer et al. | 363/67 |
| 4,045,718 | A | * | 8/1977 | Gray | 320/123 |
| 4,058,759 | A | * | 11/1977 | Halfhill | 322/13 |
| 4,419,618 | A | * | 12/1983 | Gretsch | 322/7 |
| 4,692,684 | A | * | 9/1987 | Schaeffer | 322/90 |
| 4,780,659 | A | * | 10/1988 | Bansal et al. | 322/58 |
| 4,786,852 | A | * | 11/1988 | Cook | 322/10 |
| 4,947,053 | A | * | 8/1990 | Campbell et al. | 307/10.1 |
| 5,214,371 | A | * | 5/1993 | Naidu | 322/29 |
| 5,723,972 | A | * | 3/1998 | Bartol et al. | 322/15 |
| 5,808,451 | A | * | 9/1998 | Endou et al. | 322/24 |
| 6,037,752 | A | * | 3/2000 | Glennon | 322/22 |
| 6,366,060 | B1 | * | 4/2002 | Ely et al. | 322/25 |
| 7,053,590 | B2 | * | 5/2006 | Wang | 322/24 |
| 7,084,610 | B2 | * | 8/2006 | Chen | 322/28 |
| 7,116,080 | B2 | * | 10/2006 | Chen | 322/28 |

* cited by examiner

*Primary Examiner*—Nicholas Ponomarenko
(74) *Attorney, Agent, or Firm*—Mark Sparschu; MacMillan, Sobanski, & Todd, LLC

(57) ABSTRACT

A switching circuit for an electric machine is provided. The switching circuit includes switches for energizing the phase windings of the machine and sensors for driving the state of the switches. The switches are voltage-controlled devices and the sensors are coils.

12 Claims, 5 Drawing Sheets

US 7,227,340 B2

ALTERNATOR RECTIFIER WITH COIL-SENSOR CONTROLLED MOSFETS

CROSS-REFERENCE TO RELATED APPLICATIONS

This application is a divisional of application Ser. No. 10/885,978, filed Jul. 7, 2004 now U.S. Pat. No. 7,116,080, the disclosure of which is hereby incorporated by reference.

BACKGROUND

1. Field of the Invention

The present invention generally relates to a switching circuit for an electrical machine.

2. Description of Related Art

Electric machines, such as, poly-phase claw pole alternators have been readily used in automobile applications. These alternators produce poly-phase AC currents and rectifiers are employed to convert the AC currents into DC currents to charge vehicle batteries and supply electrical power to electric vehicle devices.

In almost all vehicle alternators, P/N junction diodes are used as rectifying elements to convert AC currents into DC currents. The forward voltage drop of these power electronic P/N diodes is around 1 volt. About 8-10% of the total energy provided to an alternator will dissipate as heat in the rectifier. This heat dissipation reduces the alternator efficiency and increases temperature of rectifier and regulator.

Some other semi-conductor devices, such as MOSFET, IGBT, SCR, etc. have lower forward voltage drop when used as rectifying elements. One common feature of these semiconductor devices is that electric control signals are required to determine the open or close status of these devices. They are controlled switches and abbreviated as switches in this invention. Among these switches power MOSFETs have the best characteristics for alternator applications in today's automobiles with 14-volt electic power system. Diodes are passive rectifying elements and require no control signal, however, MOSFETs are active rectifying elements and often require complex control signals.

Although some rectifiers with MOSFETs as rectifying elements have been developed, the main drawback of MOSFET rectifiers is the cost and complexity of the supporting electronics. Typically, expensive IC circuits are employed to supply voltage signals to control MOSFETs. These IC circuits significantly increase the cost of vehicle alternators. Therefore, almost no mass production automobiles use alternators with MOSFET rectifiers.

The IC control circuit includes a synchronous rectifier controller and some switch gate drivers. The synchronous rectifier controller detects the angle difference between phase current and phase voltage and determines when an individual MOSFET should be in open or closed state. The switch gate drivers, which are controlled by the synchronous rectifier controller, provide voltage signals with proper magnitudes and timing, between gate pins and source pins of the MOSFETs. The MOSFETs, typically, implement a 6-step rectifying procedure for a 3-phase alternator and convert the AC currents from stator phase windings into a DC current.

The IC control circuit and switch gate drivers are sophisticated in that, often voltages of the source pins of up-side MOSFETs are "floating", therefore, an isolated voltage source is required for every individual up-side MOSFET. The cost of these control and gate driving circuits is quite high for an automobile alternator application.

In view of the above, it is apparent that there exists a need for an improved switching circuit for an electrical machine.

SUMMARY

In satisfying the above need, as well as overcoming the enumerated drawbacks and other limitations of the related art, the present invention provides a switching circuit for an electric machine, the switching circuit including switches for energizing the phase windings of the machine and sensors for driving the state of the switches.

In another aspect of the present invention, the sensor is a coil. The coil has L-turns where L is chosen such that the voltage signal provided from the coil sensor is between the threshold voltage of the corresponding MOSFET and the maximum allowable gate to source voltage of the corresponding MOSFET. For a typical automotive application, L is about $(N*M)/2$ where N is the number of turns of the windings and M is the number of pairs of rotor poles. In addition, the coil can be wound within the span of about one to two pitches of the corresponding winding or windings.

In another aspect of the present invention, the switch is a MOSFET and the switches are configured in bridge configurations to energize the windings. One of the sensors is connected across the gate and source of its corresponding switch to drive the state of the switch.

Further objects, features and advantages of this invention will become readily apparent to persons skilled in the art after a review of the following description, with reference to the drawings and claims that are appended to and form a part of this specification.

DETAILED DESCRIPTION

Figure 1:
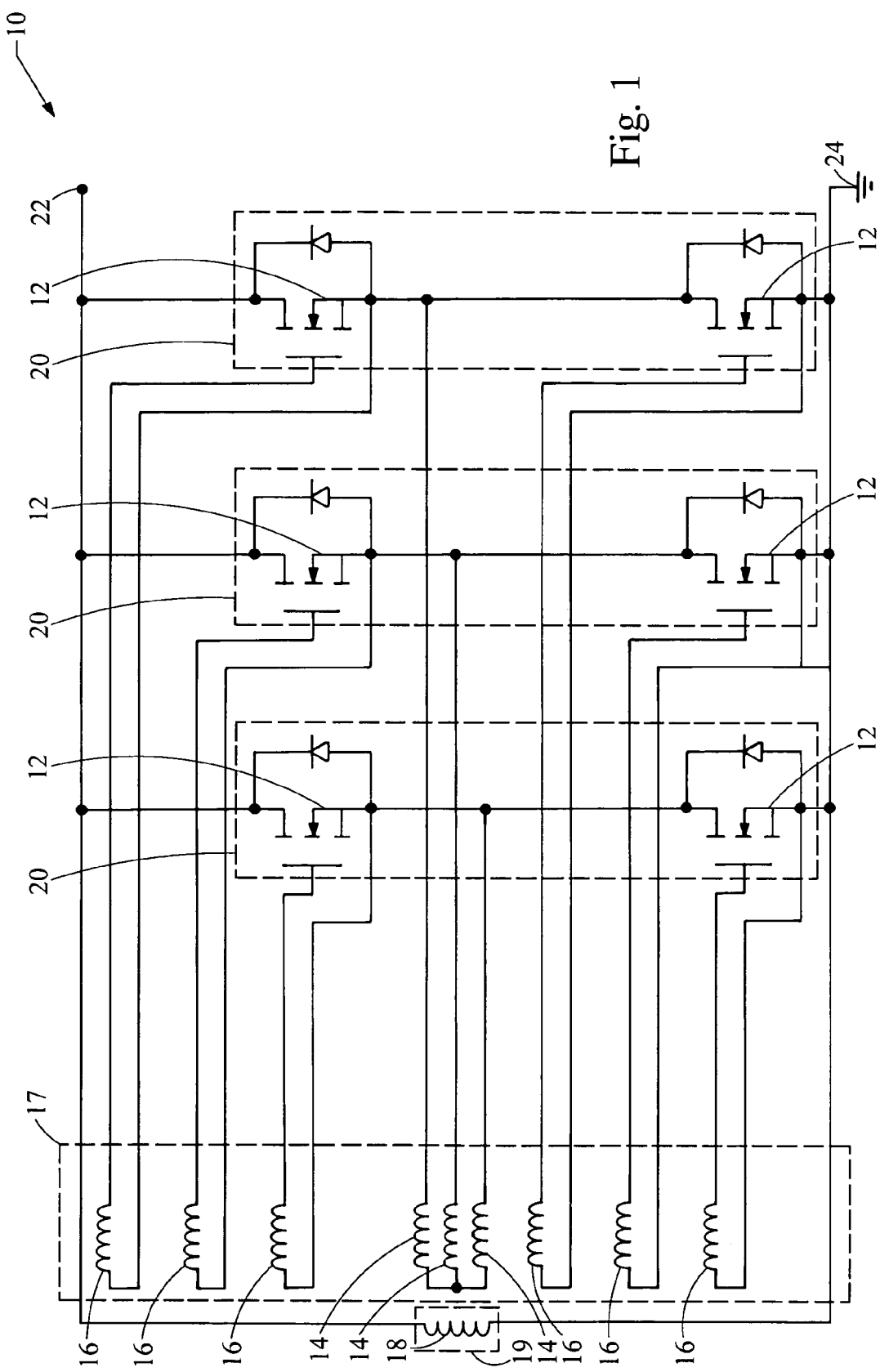
FIG. 1 is a schematic view of a switching circuit in accordance with the present invention.

Referring now to FIG. 1, a switching circuit embodying the principles of the present invention is illustrated therein and designated at 10. As its primary components, the switching circuit 10 includes switches 12 and sensors 16.

Switches 12 are shown as MOSFETS and are configured in pairs to form bridge configurations 20. Each bridge configuration 20 controls a phase winding 14 of the electrical machine. The electrical machine includes windings 14 located in a stator 17 and a rotor coil 18 located in the rotor 19. A sensor 16 is connected to each switch 12 to drive the conducting or non-conducting state of the corresponding switch 12. As such, each sensor 16 is connected between the gate and source of the corresponding switch 12. The sensors 16 may be coils built into the stator 17 and configured to generate voltage signals to control the status of the corresponding switch 12 based on the magnetic flux flowing through the coil of each sensor 16 due to the motion of the electrical machine and current flow in the stator windings and rotor. Each sensor 16 controls the status of its corresponding switch 12, and is aligned in the stator 17 with the phase winding 14 which is rectified by its corresponding switch 12, thereby forming a type of closed loop control. Typically the impedances between gate pins and source pins of MOSFETs are high and the current though the sensors 16 should be very low, or a resistor can be connected in serial between the coil sensor and gate of each MOSFET to further protect the sensor and the MOSFET from a current spike from the sensor.

For an alternator with a phase winding in a wye connection, the sensor 16 includes two L-turn coils, each L-turn coil is wound in the span of one pitch of the corresponding winding. The value for L is chosen such that the voltage signal of the sensor 16 is between the threshold voltage to change the state of the MOSFET in the maximum allowable gate source voltage of the MOSFET. For a 14-volt alternator, the suitable selection of L is about (N*M)/2, where the machine is an N turn machine with M pairs of rotor poles.

Since the sensor 16 need only provide a voltage control signal to change the status of the MOSFET and the current in the sensor is very low, the wire size used in the sensor 16 can be very small. Therefore, the coil of the sensor 16 can be wound in the span of one to two pitches of the corresponding windings. Using a small size wire, sensors 16 can be installed in the stator core with a minimal effect on the original design of the stator core and windings 14.

Although a three-phase wye connection is shown in FIG. 1, the sensor 16 may be used to drive poly-phase alternators with various connections. For example, a six-phase dual-wye or dual-delta connection may also be accommodated. In conjunction with the machine configuration, the total number and design of the sensors 16 may be modified appropriately.

Although N-channel MOSFETs are shown, both N-channel and P-channel MOSFETs may be used. If using both N-channel and P-channel MOSFETs in the same rectifier, the number of sensors 16 used in the rectifier can be reduced in half. In this configuration, the status of the up-side MOSFET is always opposite to that of the low-side MOSFET within each MOSFET pair. However, greater variety of N-channel MOSFETs are available in the market and N-channel MOSFETs are typically less expensive in comparison with P-channel MOSFETS.

Figure 2:
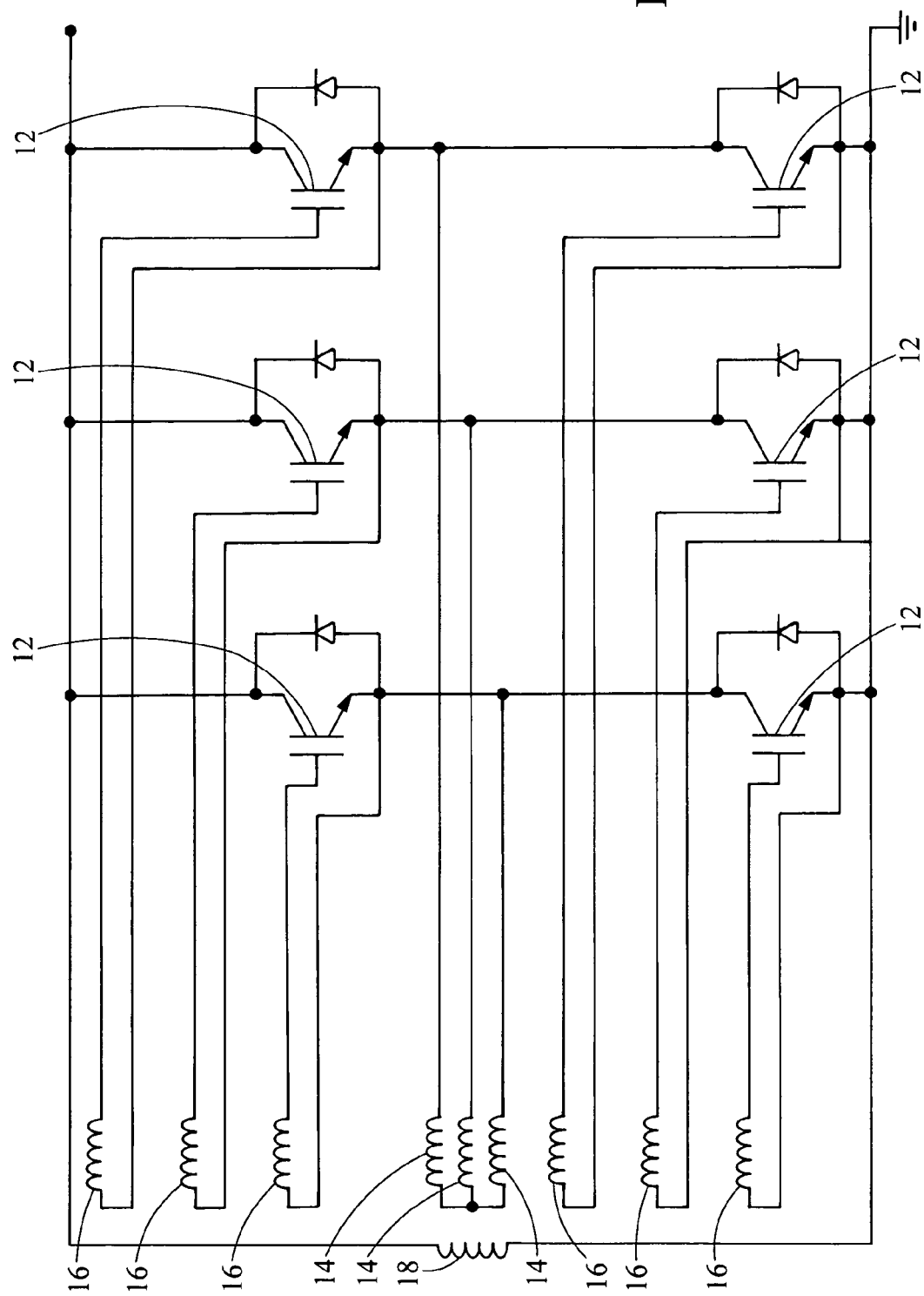
FIG. 2 is a schematic view of a switching circuit including an IGBT in accordance with the present invention.

In addition, other voltage-controlled switches may also be used as rectifying elements. Designs may be modified to use IGBTs or other solid-state switches. One example is provided in FIG. 2 where the control circuit is shown utilizing IGBTs rather than MOSFET switches. Alternatively, designs can also be expanded to include rectifiers with passive rectifier elements, such as P/N diodes or Schottky diodes, as either up-side or low-side rectifying elements, and using coil controlled MOSFETs as the complimentary up-side or low-side rectifying elements. Although this may reduce the number of sensors 16 required, the performance and efficiency improvement of these designs will be lower.

Figure 3:
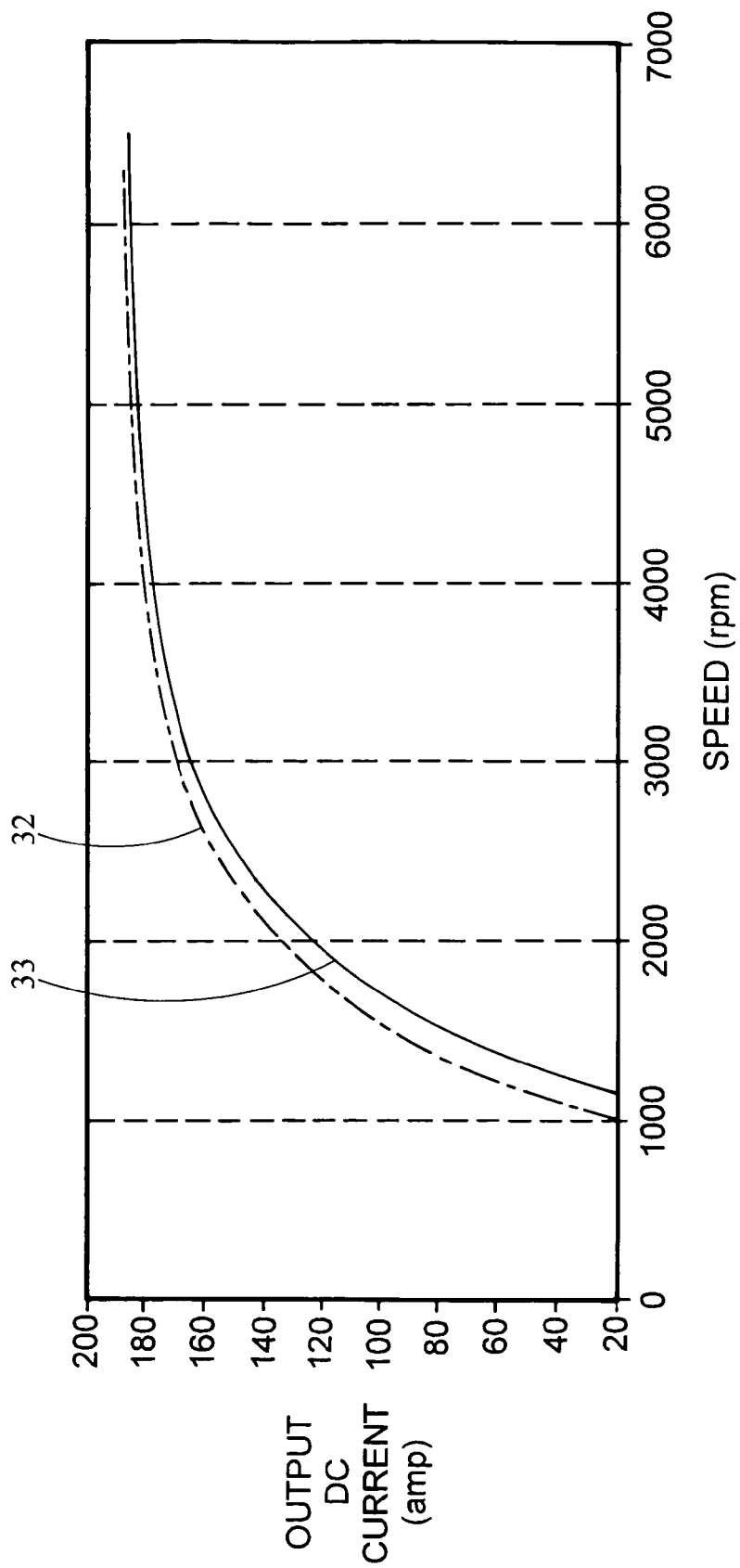
FIG. 3 is a graph illustrating the DC output improvement using the switching circuit shown in FIG. 1.

FIG. 3 illustrates an example of the DC output improvement that may be achieved using the switching circuit shown in FIG. 1. Line 30 represents the output DC current using the sensor controlled MOSFET rectifier of the present invention. Line 32 represents a rectifier using a standard P/N diode configuration. At engine idle speed, the most important speed region, the output current increases by about 15%. In addition, efficiency is improved particularly around the 20 amp loading condition, a typical load under normal driving conditions.

Figure 4:
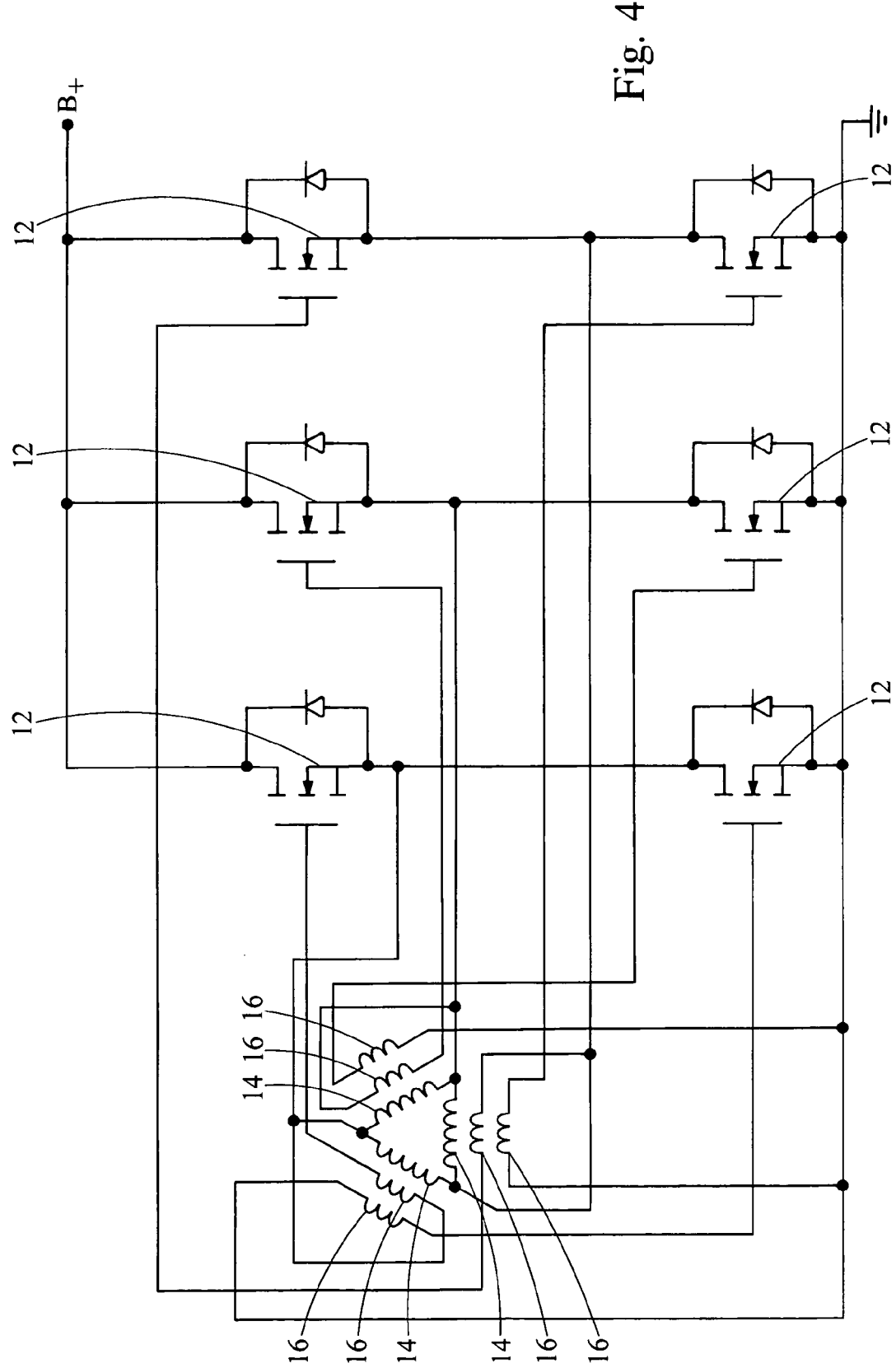
FIG. 4 is a schematic view of a switching circuit used in conjunction with a delta phase winding configuration.

FIG. 4 illustrates the sensor coils in the stator core for a 3-phase electric machine with the stator winding in delta connection 32. The sensor 16 is a L-turn coil wound in the span of one phase winding pitch. The value for L is chosen such that the voltage signal of the sensor 16 is between the threshold voltage to change the state of the MOSFET and the maximum allowable controlling voltage in this instance the gate-source voltage of the MOSFET.

For a 14-volt alternator, the suitable selection of L is about (N*M)/2, where the machine is an N turn machine with M pairs of rotor poles. The coil is wound proximate a corresponding winding. Since the wire size of coils is very small, these coils can be wound and installed within the span of one pitch of the corresponding stator winding.

Figure 5:
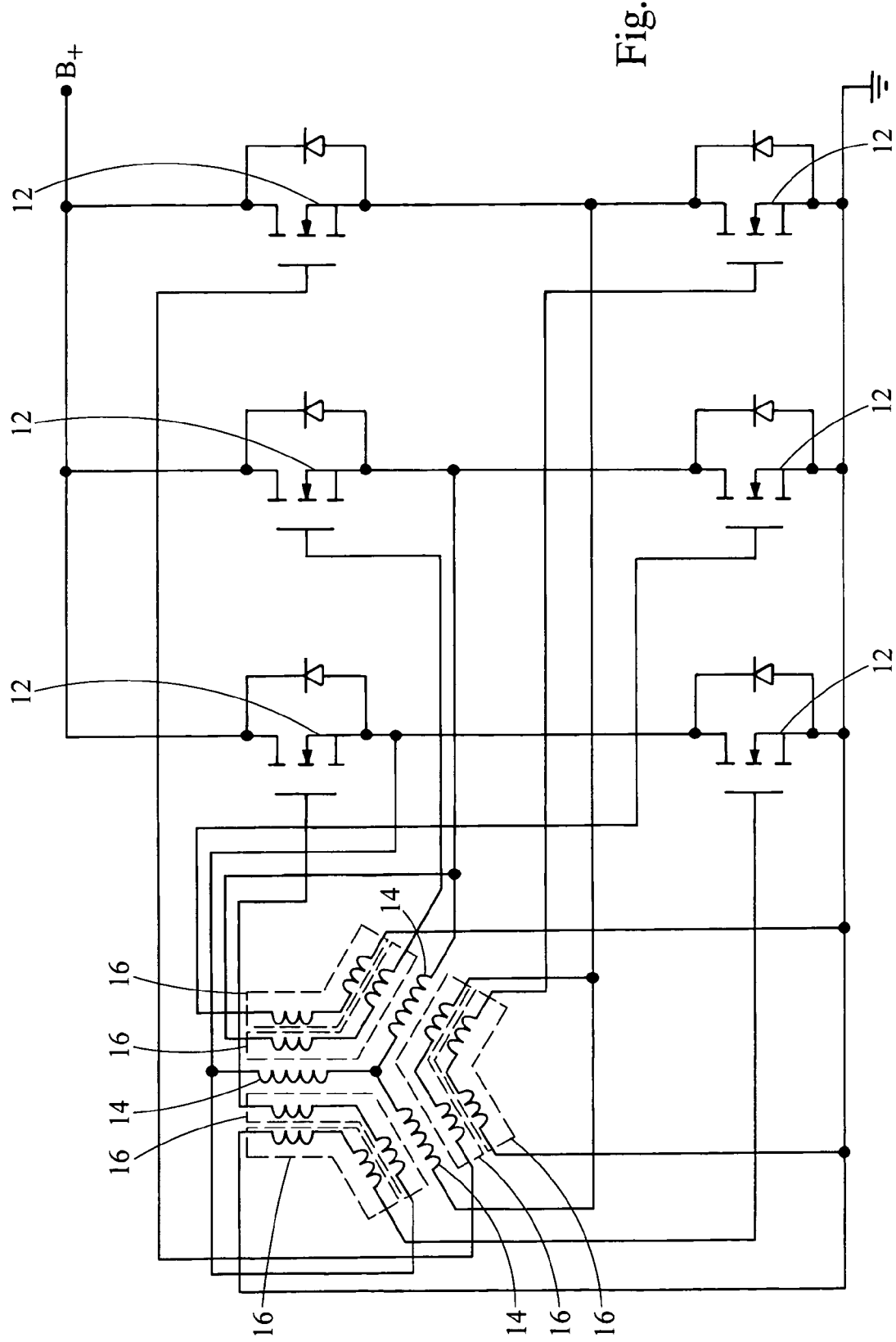
FIG. 5 is a schematic view of a switching circuit used in conjunction with a wye phase winding configuration.

FIG. 5 illustrates the sensor coils in the stator core for a 3-phase electric machine with the stator winding in wye-connection 34. The coil windings are more complex than those in delta-connection, and each sensor 16 may interact with more than one corresponding winding 14. Coils in this design can be wound and installed within the span of between one to two pitches of the corresponding stator windings. Concepts and designs in this invention are readily expanded to poly-phase designs with variety stator winding connections, such as 6-phase dual-wye and 6-phase dual-delta connections.

As a person skilled in the art will readily appreciate, the above description is meant as an illustration of implementation of the principles in this invention. This description is not intended to limit the scope or application of this invention in that the invention is susceptible to modification, variation and change, without departing from spirit of this invention, as defined in the following claims.

I claim:

1. A switching circuit for an electric machine, the electric machine including a rotor and a stator with plurality of phase windings in the stator, the switching circuit comprising:
   a plurality of switches each switch connected to at least one of the plurality of phase windings;
   a plurality of coils, each coil being located in the stator of the electric machine and in communication with a switch of the plurality of switches to manipulate a state of the switch based on a current flowing through a phase winding of the plurality of phase windings.

2. The coils according to claim 1, wherein each coil being located proximate to at least one phase winding of the plurality of phase windings and configured to control at least one switch of the plurality of switches.

3. The switching circuit according to claim 1, wherein each coil is an L-turn coil where L is chosen so that the voltage signal of each coil is between the threshold and the maximum allowable controlling voltage of the switches.

4. The switching circuit according to claim 3, wherein L is about one to two times of (N*M)/2 where N is the number of turns of the phase windings and M is the number of pairs of rotor poles.

5. The switching circuit according to claim 1, wherein each coil is wound within the span of about one to two pitches of the phase winding.

6. The switching circuit according to claim 1, wherein the switch is a MOSFET.

7. The switching circuit according to claim 6, wherein the switch is an N-channel MOSFET.

8. The switching circuit according to claim 6, wherein each coil is connected across the gate and the source of the MOSFET.

9. The switching circuit according to claim 6, wherein each coil is an L-turn coil where L is chosen so that the voltage signal of each coil is between the threshold and the maximum allowable gate to source voltages of the MOSFETs.

10. The switching circuit according to claim 1, wherein pairs of switches of the plurality of switches are configured in a bridge configuration to energize at least one of the plurality of phase windings.

11. The switching circuit according to claim 1, wherein the switch is an IGBT.

12. The switching circuit according to claim 11, wherein the coil is an L turn coil where L is chosen so that the voltage signal of the coil is between a threshold and the maximum allowable gate to emitter voltages of the IGBT.

* * * * *